United States Patent [19]

Perry

[11] 3,876,913

[45] Apr. 8, 1975

[54] ELECTRONIC CIRCUIT FOR ACTIVATING AN ELECTRIC LOCK

[75] Inventor: Richard Frederick Perry, London, England

[73] Assignee: Keith James Goss, London, England; a part interest

[22] Filed: Nov. 12, 1973

[21] Appl. No.: 415,246

[52] U.S. Cl. .................................. 317/134; 70/278

[51] Int. Cl. .................................. E05b 49/00

[58] Field of Search .... 317/134; 340/63, 64, 147 R, 340/147 CN, 147 MD, 149 R, 149 A, 164 R, 164 A, 164 B; 70/277, 278; 307/10 AT

[56] References Cited

UNITED STATES PATENTS 3,633,167 1/1972 Hedin .................................. 317/134

3,754,164 8/1973 Zorzy .................................. 317/134

*Primary Examiner*—J. D. Miller

*Assistant Examiner*—Harry E. Moose, Jr.

*Attorney, Agent, or Firm*—Brown, Murray, Flick & Peckham

[57] ABSTRACT

An electronic circuit is provided for operating an electric lock. The circuit is activated by switching a pre-selected combination of switches in a pre-selected sequence. Any number of switches may be provided and there may be more switches than switches forming the pre-selected combination. Furthermore, circuitry may be provided such that the circuit is only activated if each switch is switched within a pre-selected time delay of the switching of the preceding switch.

8 Claims, 5 Drawing Figures

ELECTRONIC CIRCUIT FOR ACTIVATING AN ELECTRIC LOCK

This invention relates to an electronic circuit for activating an electric lock.

Conventional locks require the easier-to-carry key which is inconvenient and may be lost, allowing illegal entry into premises protected by the lock. Combination locks are mechanical devices and do not provide a very secure protection.

This invention is intended to provide a lock having a high degree of security which overcomes the disadvantages of the previously known systems.

According to the present invention there is provided an electronic circuit for operating an electric lock comprising an array of switches and logic circuitry connected to at least some of the switches, the circuit being activated when a pre-selected combination of the switches is switched in a pre-selected sequence.

The switches may be push-button switches or any other suitable form of switches such as proximity switches.

The circuit may also comprise delay circuitry connected between the switches and arranged such that the circuit is only activated when the switches of the combination are switched in sequence with a pre-selected time delay between each switching operation.

The electronic circuit may also comprise additional logic circuitry for preventing the activation of the lock if incorrect switches are switched or are switched out of sequence.

An alarm may also be provided to give an indication of a person attempting illegal entry when a wrong combination is switched.

The invention will now be described in more detail, by way of example only, with reference to the accompanying drawings in which FIG. 1 is a block diagram of an electronic circuit for activating an electric lock;

Figure 1:
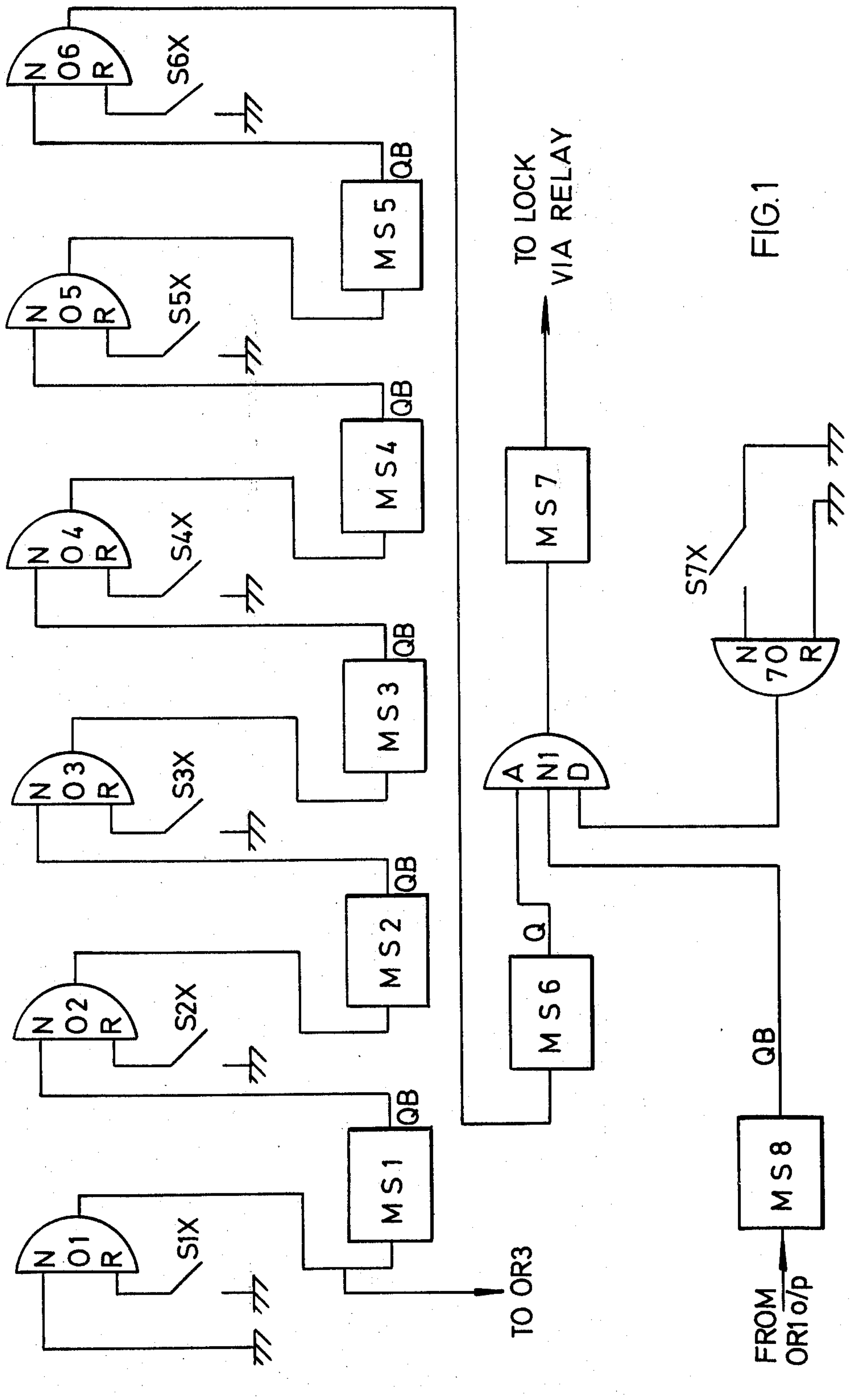

The electronic circuit comprises 12 push-button switches of which 7, S1X to S7X, are shown in FIG. 1. Each of switches S1X to S7X is connected to a first input of respective NOR gates NOR1 to 7. The outputs of NOR gates 1 to 6 are connected to inputs of respective monostable multivibrators MS1 to MS5 whose QBar outputs are connected to the second inputs of the following NOR gates. The second input of the first NOR gate is connected to earth. The Q output of monostable multivibrator MS6 is connected to a first input of AND gate 1 having a second input connected to the QB*ar* output of a multivibrator MS8 and a third input connected to the output of NOR gate 7. The output of AND gate 1 is connected to the input of a monostable multivibrator 7 whose output is connected to a relay (not shown) to operate an electric lock. If S1X is depressed NOR gate 1 gives a high output which triggers the first monostable multivibrator MS1 whose QB*ar* output goes LOW for 2 seconds, for example. If S2X is depressed within 2 seconds of depressing S1 to trigger the second monostable MS2, the process is repeated up to the pressing of switch SX6. Each switch must therefore be pressed within 2 seconds for example, of the pressing of the preceding switch. After the depressing of SX6, the Q output of multivibrator MS6 is in the HIGH condition for 2 seconds and providing the monostable MS8 has not been triggered, (the function of MS8 will be described later) the pressing of SX7 within the prescribed time of 2 seconds will open the AND gate to trigger the lock monostable multivibrator MS7. With this triggered the electric lock is activated for the duration of the pulse width of monostable multivibrator 7 which, for example, could be 5 seconds.

Figure 2:
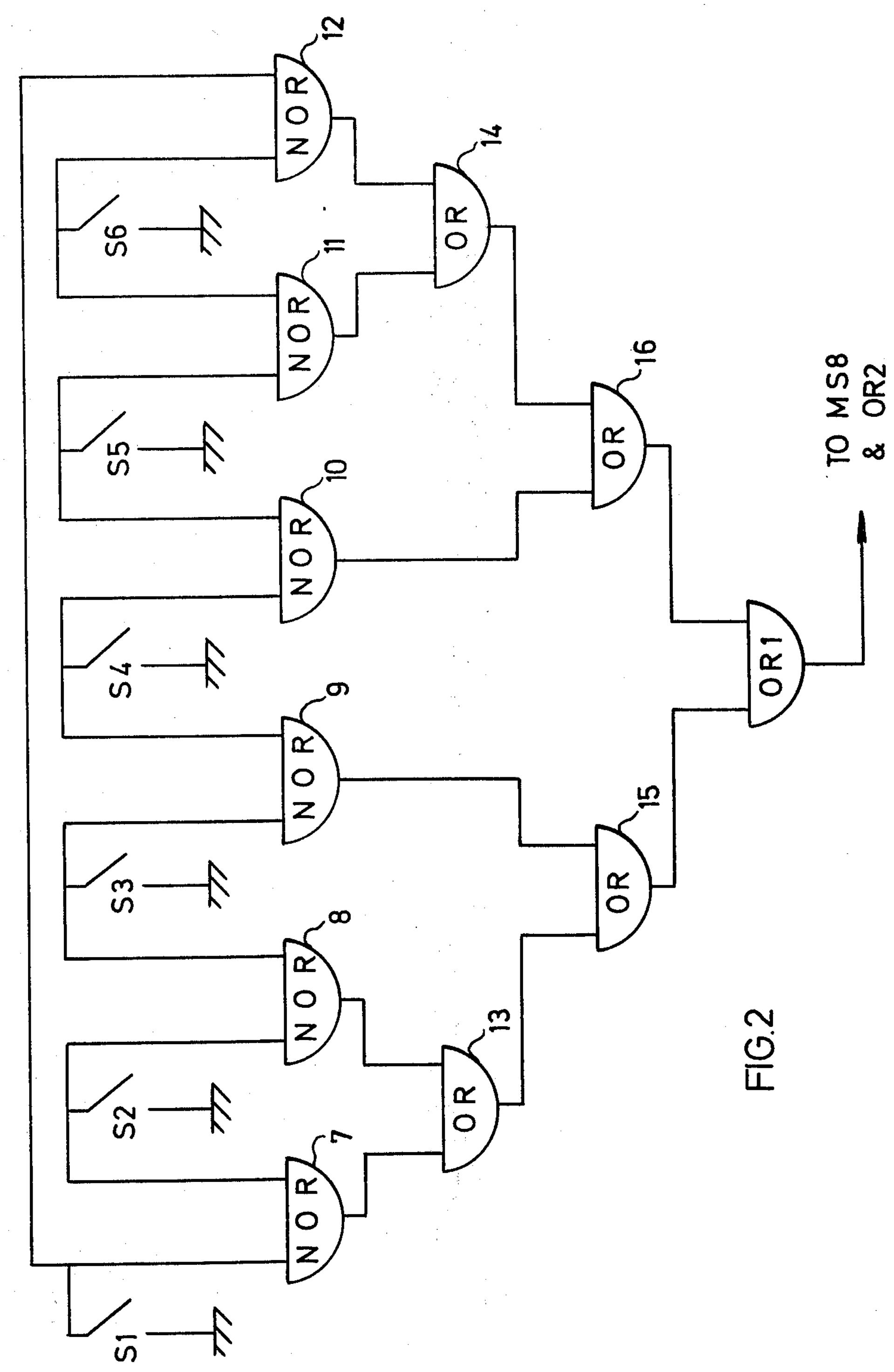
FIG. 2 is a block diagram of a safety system for incorporation into the circuit.

The circuit shown in FIG. 2 is a safety circuit which closes the AND gate 1 if a wrong combination of push-buttons is pressed. The first NOR gate 7 has its inputs connected to S1 and S2 and the second NOR gate 8 has its inputs connected to S2 and S3 and so on, until the last NOR gate NOR12 which has its inputs connected to S6 and S1. The NOR gates 7 and 8 have their outputs connected to the inputs of an OR gate 13 and similarly NOR gates 11 and 12 have their outputs connected to the inputs of an OR gate 14. NOR gates 9 and 10 have their outputs connected to inputs of OR gates 15 and 16 whose other inputs are connected to the outputs of OR gates 13 and 14. The outputs of OR gates 15 and 16 are connected to OR gate 1 whose output is connected to the input of the monostable vibrator MS8.

If S1 to S6 are pressed simultaneously the NOR gates and OR gates are activated which in turn trigger the monostable multivibrator MS8 whose QB*ar* input goes LOW to prevent the AND gate 1 from opening and thus the electric lock from being operated. MS8 is also triggered if any of the combinations S1 and S2, S2 and S3, or S3 and S4, S4 and S5, S5 and S6, or S6 and S1 are pressed together. Therefore, the only method of activating the electric lock is to press the correct combination, one button at a time and within the predetermined time limit. The circuit can also be arranged so that the triggering of the safety monostable triggers the alarm system.

Figure 3:
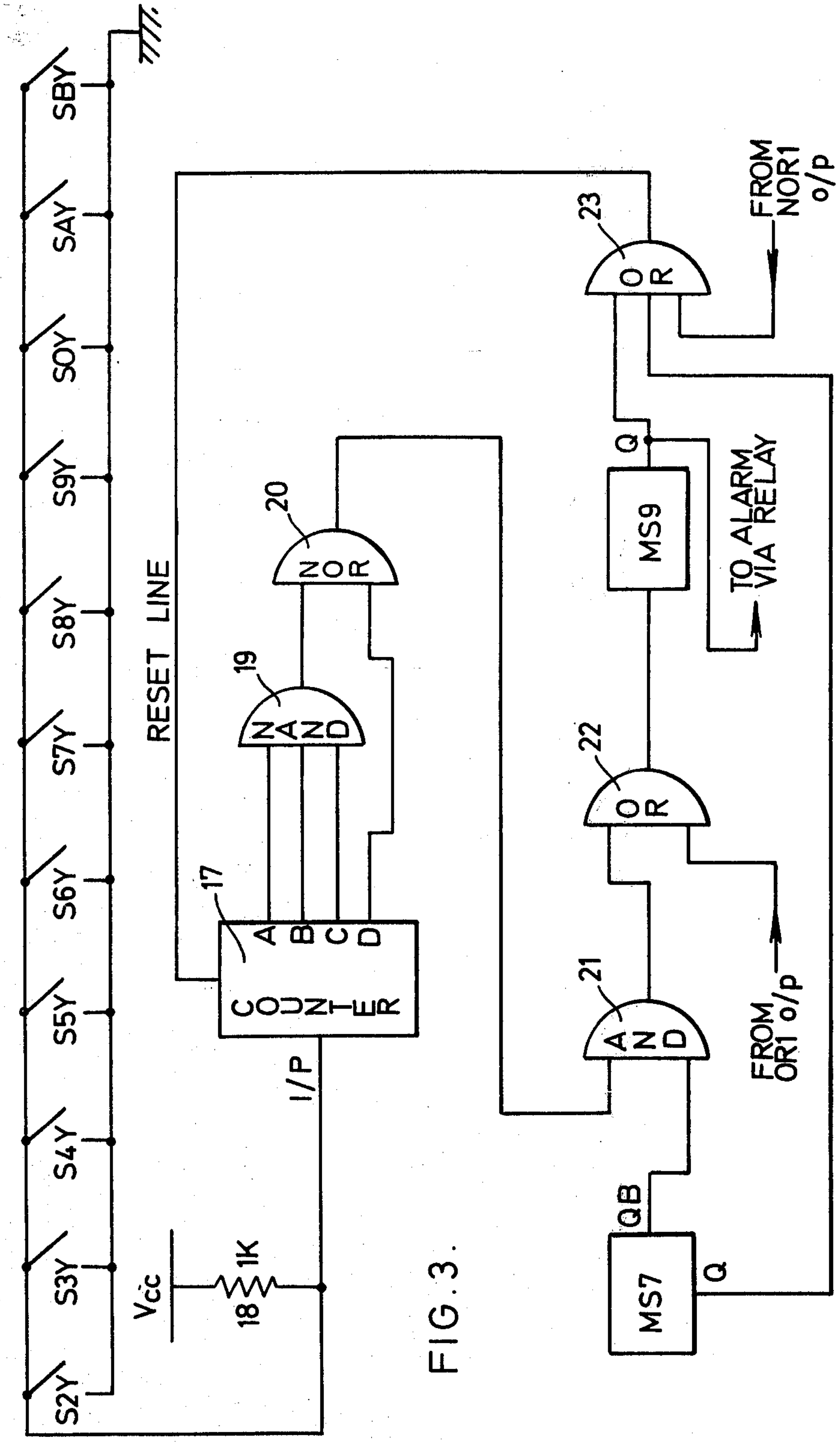
FIG. 3 is a block diagram of an alarm system for incorporation into the circuit.

The circuit shown in FIG. 3 provides for an alarm to be triggered under certain conditions. The electronic circuit as has been stated, has 12 push-button switches of which 7 are connected to the NOR gates in FIG. 1. The switches S2 to S7 are preferably double pole switches having their second poles arranged as shown in FIG. 3 and the remaining switches which are not used in the combination may just be single pole switches S8Y to SBY. The second poles of the switches S2Y to S7Y and the switches S8Y to SBY are connected to the inputs of a Counter 17 which unless earthed by the closure of one of the switches S2Y to SBY is held at a HIGH voltage by resistor 18. Outputs A,B and C of the Counter are connected to inputs of a NAND gate 19 whose output is connected to the first input of a NOR gate 20 having a second input connected to the output D of the Counter 17. The output of the NOR gate 20 is connected to the input of an AND gate 21 connected to the QB*ar* output of the monostable multivibrator 7. The output of the AND gate 21 is connected to the input of an OR gate 22 having a second input connected to the output of the OR gate 1 of the safety circuit shown in FIG. 2. The output of the OR gate 22 is connected to the input of the monostable multivibrator MS9 whose Q output is connected to an alarm via a relay system. The Q output of the monostable multivibrator 9 is also connected to the input of an OR gate 23 having a second input connected to the Q output of the monostable multivibrator MS7 and a third input connected to the output of the NOR gate 1 of the switch S1X. The output of the OR gate 23 is connected to the Reset input of the Counter 17.

If any of switches S2Y to SBY are pressed a total of 7 times without S1 being pressed, the counter counts up to 7 giving outputs 1 1 1 and 0 on the lines A B C and D. In this case if MS7 has been triggered, the AND gate 21 triggers the alarm monostable MS9 which in turn activates the alarm. Alternatively, if OR gate 22 has an input from OR gate 1 from the safety system, the monostable MS9 is also triggered. The counter can be reset by the pressing of the switch S1, the triggering of the monostable MS7, or the triggering of the alarm monostable MS9.

The circuit of FIG. 1 allows for any combination of numbers to activate the alarm including repetition of numbers, providing they are not adjacent combinations. For example, the circuit of FIG. 1 could be arranged to activate the lock when the switches S1,2,1, 3,1,4, 1, were activated in that order and this is simply arranged by connecting the switch input wires of NOR3, NOR5, and NOR7 to the switch input of NOR1.

Figure 4:
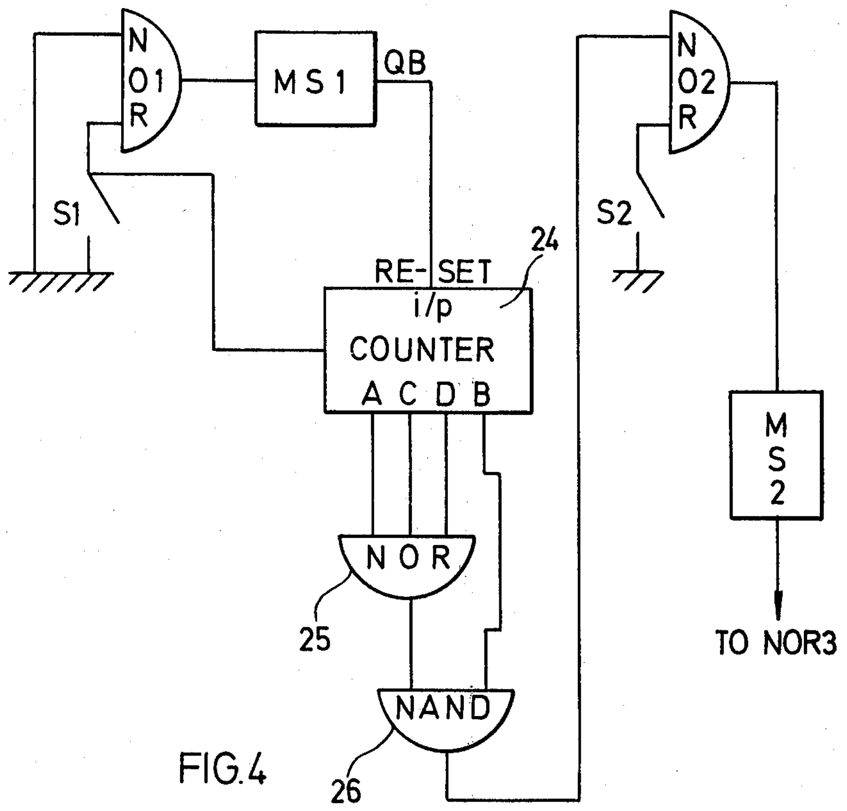
FIG. 4 is an alternative circuit for activating an electric lock.
Figure 5:
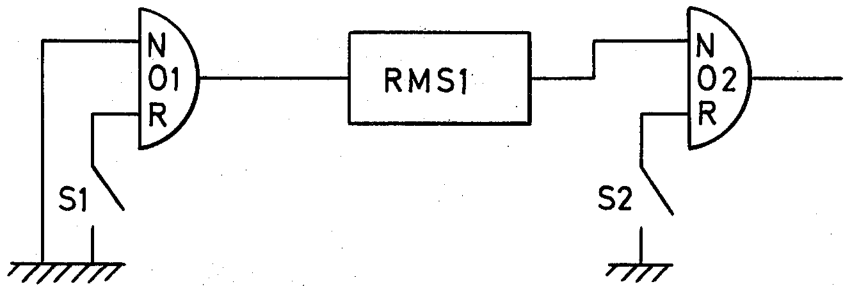
FIG. 5 is a modification of FIG. 4.

However, the circuit of FIG. 1 does not allow for successive repetitions of digits, such as in the combination 1 1 2 3 4 5 6, for example. Successive repetitions are catered for by the circuit shown in FIG. 4. The switch S1 is connected as before to a first input of NOR gate 1 whose output is connected to multivibrator MS1. The switch S1 is also connected to the input of a Counter whose Reset input is connected to QB*ar* output of multivibrator MS1. A C and D outputs of the Counter 24 are connected to the inputs of the NOR gate 25 whose output is connected to the input of the NAND gate 26 having a second input connected to the B output of the Counter 24. The output of the NAND gate 26 is then connected to the input of the NOR gate 2 whose second input is connected to the switch S2 having output at the NOR gate 2 is connected to the monostable multivibrator MS2 as before.

Pressing S1 for the first time triggers MS1, which in turn enables the Counter for the duration of the pulse width of MS1. Releasing S1 gives a positive going edge at the counter input so that the counter now registers that S1 has been pressed once. S1 must now be pressed and released again followed by S2, before the counter is reset by the rising edge of the MS1 output, to enable the signal to proceed to the NOR3 input.

In this manner any digit may be repeated successively any number of times by suitable decoding of the counter outputs.

An alternative method of achieving this repetition of digits, is to use a retriggerable monostable multivibrator RMS1, which eliminates the need for a counter. This is achieved by using a suitable pulse width for the retriggerable monostable multivibrator RMS1. The pulse width is chosen such that the switch S2 cannot possibly be pressed in time to allow the signal through to NOR3, unless S1 has been pressed a sufficient number of times. This is because every subsequent activation of S1 extends the pulse width of RMS1 by an amount equal to the orginal pulse width.

Returning for the moment to FIG. 3, it can be seen that if SA, for example, is held down then the counter will not register any subsequent presses. In this way the alarm system could be eliminated. This problem could be, however overcome by extending the combinations of double presses which are recognized by the safety system shown in FIG. 2.

The electronic circuit can be used to activate any kind of electric lock. It can be used for example with car ignition systems. The electronic circuit has two main advantages. Firstly no key is required, and secondly with suitable monostable pulse widths, the lock can serve as a reaction test so that if the combination was not completed quickly enough, the lock would not open. The electronic circuit may be used in conjunction with any other entry system.

In the example, 12 push-buttons were used out of which 7 formed the combination. However, any number of push-buttons can be used and any number of these can be used to provide the combinations. There are therefore a very large number of combinations that can be formed out of such a system.

I claim:

1. An electronic circuit for operating an electric lock comprising an array of switches, at least some of said switches forming a pre-selected combination, logic circuitry having a series of logic gates connected to said switches forming said pre-selected combination, and delay circuitry connected between the switches forming said combination, whereby said circuit is only activated when the switches of the combination are switched in a pre-selected sequence within a pre-selected time delay, said delay circuitry including a series of monostable multivibrators having a predetermined pulse width, the monostable multivibrators being connected between the output of one logic gate and an input of a following logic gate, except for the output of the last but one logic gate which is connected through a monostable multivibrator to the input of an AND gate whose output is connected to the input of a further monostable multivibrator whose output is connected to a relay for operating said lock, a second input of said AND gate being connected to said last switch of said combination through a logic gate.

2. The circuit of claim 1 in which said logic gates connected to said switches are NOR gates, and the QB*ar* outputs of said monostable multivibrators are connected to the inputs of said NOR gates except for the multivibrator connected to the last but one NOR gate, said multivibrator having its Q output connected to an input of said AND gate.

3. The electronic circuit of claim 2 comprising additional logic gates connected to at least some of said switches forming said combination, said additional logic gates producing an output when selected combinations of said switches are switched simultaneously, said output being arranged to deactivate the electronic circuit.

4. The electronic circuit of claim 3 in which the switches of said combination apart from said first switch are double pole switches, and wherein the circuit comprises a counter, means for decoding the output of said counter, and means for activating an alarm, whereby said alarm is activated when said switches are pressed a number of times equal to the number of digits in said pre-selected combinations.

5. The electronic circuit of claim 4 in which the output of said additional logic gates for indicating when selected combinations of said switches are switched simultaneously is also connected to a circuit for activating said alarm system.

6. The electronic circuit of claim 5 in which said output of said additional logic gates, the outputs from a first logic gate connected to said first switch of said combination, and the outputs of said alarm activating system are connected to the reset input of said counter for resetting said counter.

7. The electronic circuit of claim 6 comprising a counter connected between logic gates connected to consecutive switches, decoding circuitry connected to the output of said counter, said decoding circuitry only providing an output when a switch of the combination is pressed a pre-selected number of times, said counter thus providing consecutive repetitions of digits in said combinations.

8. The electronic circuit of claim 6 comprising a retriggerable monostable multivibrator between adjacent logic gates connected to adjacent switches of said combinations, the pulse width of said retriggerable monostable multivibrators being chosen such that the following gate cannot be opened unless the preceding switch is switched the requisite number of times.

* * * * *